ature Patent Office
3,423,590
Patented Jan. 21, 1969

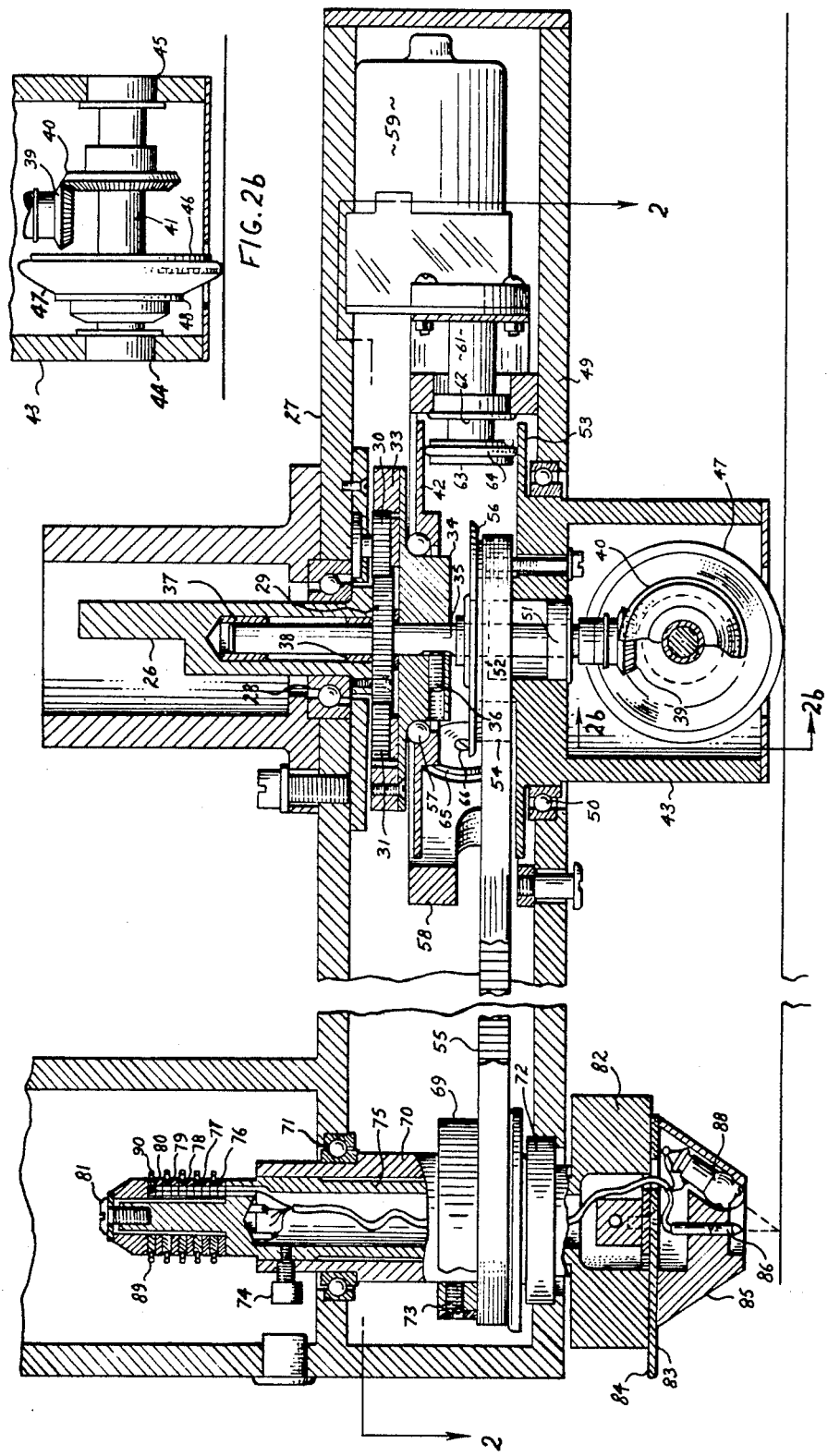

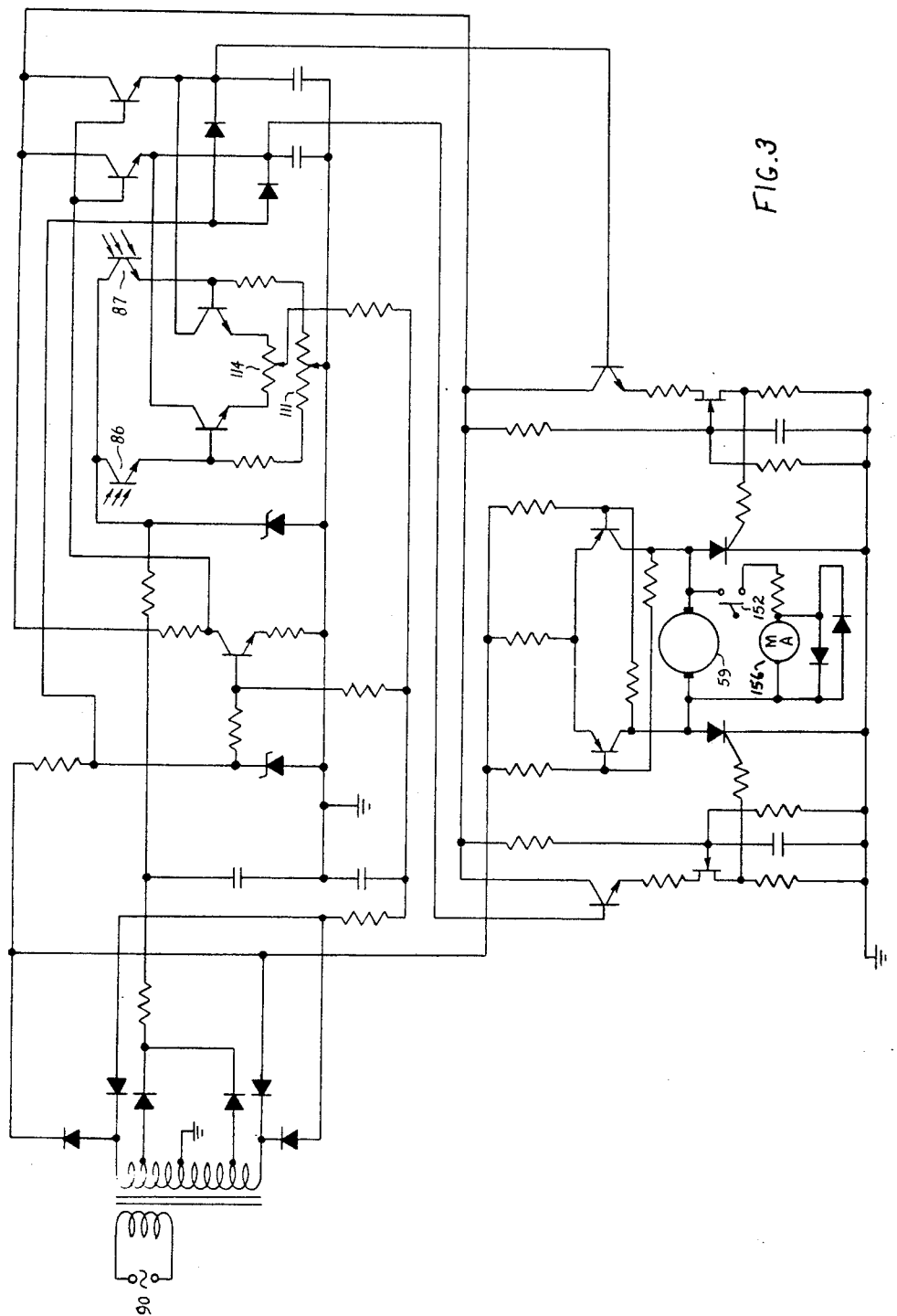

1

3,423,590
STEERABLE DRIVE WHICH BECOMES DISENGAGED UPON REMOVAL FROM THE DRIVE SURFACE
George S. Jewell, Ancaster, Ontario, Canada, assignor to Canadian Westinghouse Company Limited, Hamilton, Ontario, Canada, a Canadian company
Filed Oct. 19, 1965, Ser. No. 497,996
Claims priority, application Canada, Apr. 17, 1965, 928,434
U.S. Cl. 250—202          7 Claims
Int. Cl. G05b 13/02

ABSTRACT OF THE DISCLOSURE

A pattern tracing mechanism for a machine such as flame cutters requires a steerable friction drive wheel. The invention disclosed provides a steerable drive wheel which is disengaged from its steering motion when lifted from the drive surface. The drive is also compensated for steering velocity to provide a constant tangential drive velocity.

---

Figure 1:
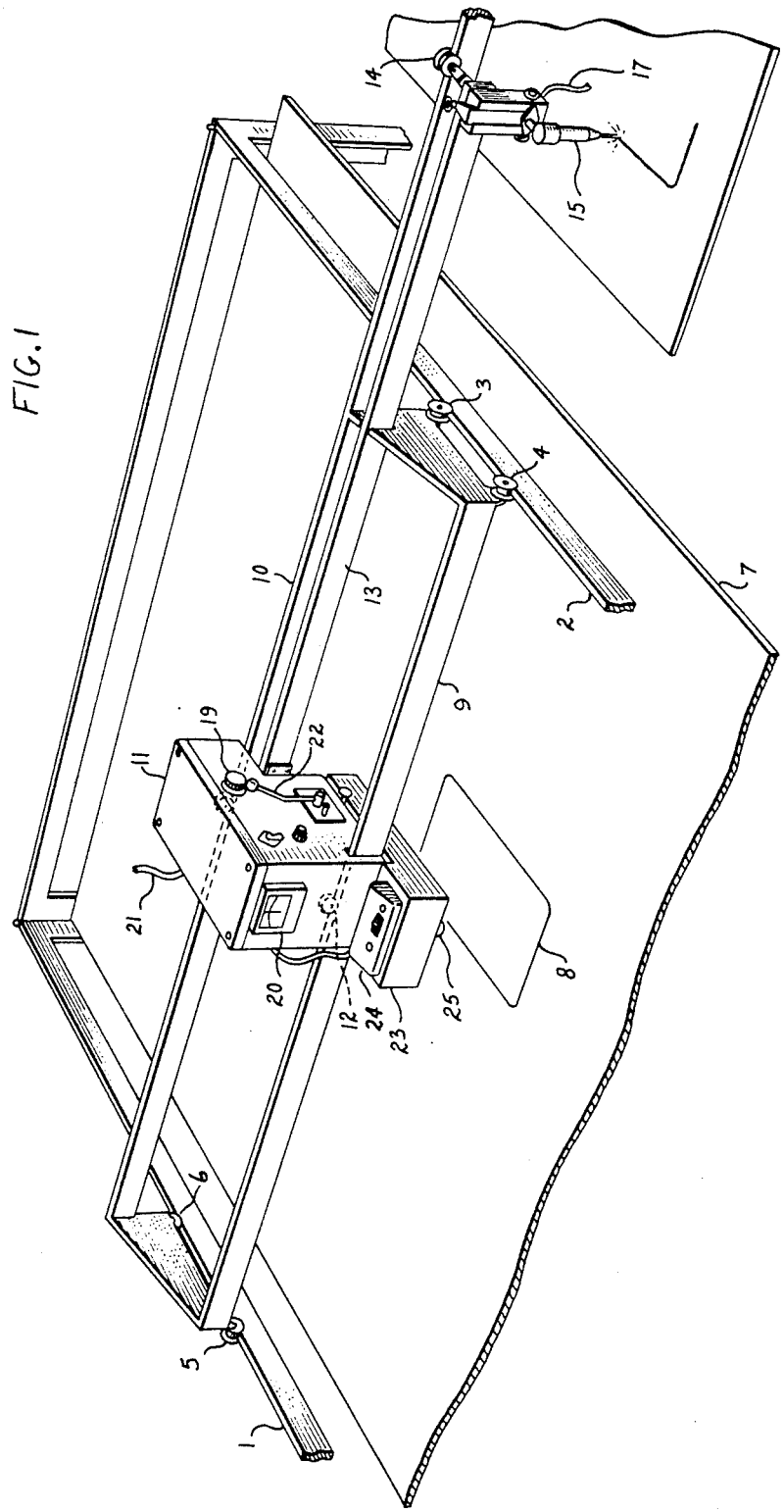

This invention relates to gas cutting machines and in particular to steerable drive mechanisms for such machines.

Gas cutting machines are commonly used to cut shapes out of sheets of metal particularly ferrous metals and normally such machines consist of a suitable support for the torch and a follower mechanism of some sort which may be guided around the pattern in order that the torch may cut a similar shape from the sheet of metal.

Examples of such mechanisms are shown in U.S. Patent No. 2,261,644 assigned to General Electric Company and U.S. Patent No. 2,461,585 assigned to Air Reduction Company. As will be seen in both of these patents, the torch is supported for movement in all directions in a single plane within a limited area. The velocity of the torch along its path is determined by the drive mechanism which consists of a friction drive wheel mounted for movement in a corresponding plane to the plane of the material to be cut. In operation, the operator steers the friction drive wheel around the pattern thus causing the torch to move in a corresponding pattern since there is a direct linkage between the friction drive wheel and the torch. The latter patent, that is 2,461,585 gives a clearer illustration of the friction drive assembly and is particularly directed towards correction for velocity errors which may occur due to steering. The steering is provided in this latter case by the operator. It is known, however, to provide steering by some other means. For example, in U.S. Patent No. Reissue 25,581 there is shown an optical line tracing system for guiding the friction drive wheel. The apparatus in this case automatically follows a pattern causing the friction drive wheel to drive the torch at constant speed around the pattern and cut, when in operation, a similar shape from the sheet of metal. The latter patent is only one example of numerous optical following systems which are controlled by patterns. However, to clarify the terminology it is advisable to note that there is a differentiation between a line and an edge.

In the optical following art, systems intended to follow a long thin mark which has a different optical characteristic from its background, are referred to as line following systems, whereas systems designed to follow a change in optical characteristic between two relatively continuous surfaces, that is the edge of the surface, are referred to as edge tracing systems. Optical systems intended to follow lines generally will not follow edges without modification.

2

The drive mechanisms of this invention will be described in association with a line tracing system but it will be understood that other line tracing or edge tracing or pattern following systems may be utilized in conjunction with the drive mechanism of this invention.

It is an object of this invention to provide a steering mechanism which can be conveniently attached to the friction drive of a gas cutting machine.

It is a further object of this invention to provide a steering mechanism which protects the steering motor against inadvertent and excessive torques produced by manual steering of the friction drive.

These and other objects are obtained by providing a steering mechanism which is de-coupled from the friction drive wheel when the friction drive wheel is lifted from the pattern bearing surface, thus releasing the friction drive wheel for manual steering when in its raised position and also providing a drive mechanism for the friction drive wheel which may be conveniently coupled to the normal drive shaft of the drive mechanism.

Figure 2:
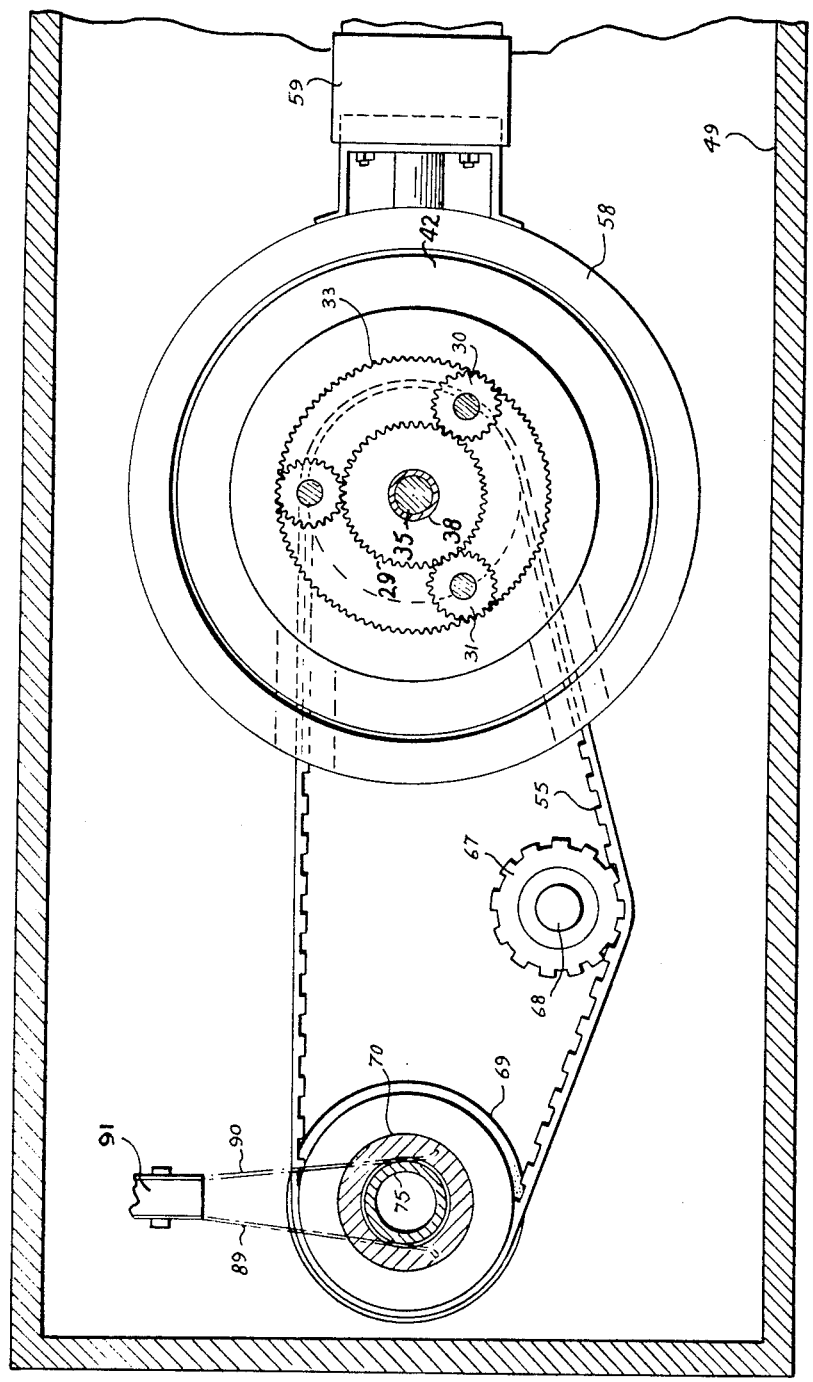

A clearer understanding of this invention may be had from the following description and drawings, in which, FIGURE 1 is an overall view of the cutting machine with which the steering mechanism is associated, FIGURE 2 is a plan view of the steering mechanism together with a suitable optical follower, FIG. 2A is an elevational view of the items shown in FIGURE 2, FIGURE 2B is sectional view of the friction drive wheel portion, FIGURE 3 is circuit diagram of an electronic control system suitable for use in association with the steering mechanism.

The optical follower mechanism and associated electronic circuitry are, as has been indicated, only one example of a pattern following mechanism suitable for use in association with steering mechanism and are more fully described and explained in co-pending application Ser. No. 497,993, filed Oct. 19, 1965, in the names of Ronald J. Luker, Robert G. Simpson and George S. Jewell.

Considering first FIGURE 1, there is shown a gas cutting machine comprising a pair of rails 1 and 2 on which the carriage is mounted having four wheels, 3, 4, 5 and 6. Between the rails is mounted table 7 which bears a pattern to be reproduced including for example the line 8. The carriage includes a further pair of rails 9 and 10 with rail 10 extending well out beyond the right hand side of the table. A drive mechanism 11, is mounted on rails 9 and 10 by means of wheels, such as wheel 12, front and back, and an arm 13 extends out to the right of this drive assembly and bears at its outer end a wheel 14, which runs on track 10. It is assumed that all the wheels referred to are single or double flange as may be desired in order to keep the vehicle tracking properly.

A cutting torch 15 is mounted at the end of arm 13 near the wheel 14 and supplied, through tubes such as 17, with gas and such other control and power supplies as may be required for its normal operation. Drive mechanism 11 includes a suitable drive motor and control for driving the carriage including the control knob 19 for adjusting the speed of the drive motor and an indicator 20 for indicating the speed, in linear units per minute, of the driving mechanism. Suitable electrical supplies for this drive are provided by cable 21.

In normal operation a friction drive wheel extends from the bottom of drive mechanism 11 and engages the surface of the table 7. The friction drive wheel is driven by the motor in the drive mechanism and by means of lever 22 the friction drive wheel may be lifted from the table and the carriage may then be freely pushed to any position on the table thus facilitating the location of the beginning of the operation. Steering mechanism 23 is enclosed within a suitable enclosure attached to the bottom of unit 11 and includes a cover 24 over the front portion of the mechanism. A small section of the optical follower may be seen at 25.

From FIGURES 2, 2A and 2B, we may obtain a clearer understanding of the steering mechanism.

A hollow shaft 26 is mounted in the upper plate 27 by means of a bearing 28. The end of this shaft bears a pinion 29. This pinion drives a plurality of planetary pinions such as 30 and 31 which engage the ring gear 33. The ring gear 33 is fastened to a disc 34 which is locked to shaft 35 by means of set screw 36. Hollow shaft 26 is maintained in alignment with shaft 35 by means of bearings 37 and 38. To the lower end of shaft 35 is fixed a bevel gear 39 which engages bevel gear 40 which is locked to shaft 41. Shaft 41 is mounted for rotation in tube 43 by means of bearings 44 and 45. Also mounted on shaft 41 is a friction drive wheel comprising a metal disc 46 locked to the shaft 41 and a resilient disc 47 having a high co-efficient of friction which is locked to the disc 46 by a compression member 48. The tube 43 is mounted for rotation in the lower plate 49 by means of bearing 50 and fits the inner race of bearing 50 with a smooth sliding fit thus permitting vertical motion of the sleeve 43 within the bearing 50. The sleeve 43 is maintained coaxial and parallel with shaft 35 by means of a pair of bearings 51 and 52. The sleeve 43 extends outwardly into a flange 53 and mounted on top of the flange is a toothed wheel 54 suitably contoured to engage a driving belt 55. A flat disc 56 is mounted on top of the toothed wheel 54 and prevents the belt 55 from moving vertically up on the toothed wheel 54.

An annular disc 42 is axially fixed relative to disc 34 by means of ball bearings 57. An annular support member 58 surrounds discs 42 and 53 and is mounted by bolts in baseplate 49 in such a way as to permit limited vertical movement and no rotational or transverse movement. Steering motor 59 is mounted on annular member 58 and the shaft of steering motor 59 is coupled to a shaft 61 which is mounted in member 58 by means of bearing 62. Shaft 61 extends inwards to a point inside thee annular member 58 and there is formed into a wheel 63 with a suitable friction surface at the rim such as the O ring 64 of elastomeric material. Two similar wheels are mounted at 120 degrees relative to each other around the annular member 58. These remaining two wheels, however, are merely fixedly supported for rotational motion on the annular member 58 as shown with respect to wheel 65 which is mounted on annular member 58 by means of bolt 66.

Also mounted on the baseplate 49 is a further toothed wheel 67 which is rotatably mounted on the plate 49 by means of bolt 68 and may be adjusted transversely in the plate in such a manner as to control the tension of belt 55.

A further toothed wheel 69 is used to rotate the optical follower portion of the device. This portion of the device includes a tube 70 which is mounted in bearings 71 and 72 in the upper and lower plates 27 and 49 respectively. The toothed wheel 69 is locked on to the tube 70 by means of set screw 73. A photo electric assembly is mounted within this tube and locked therein by means of thumb screw 74. The photo-electric assembly includes a tubular sleeve 75 on the upper end of which is a series of slip rings 76, 77, 78, 79 and 80 which are locked to the top of tubular member 75 by means of bolt 81. The tubular member 75 expands at its lower portion to a cylinder 82. A disc 83 is slidably mounted on the bottom of cylinder 82 and includes an extension 84 which protrudes out in front of cylinder 82. A conical member 85 is fixedly mounted on the disc 83 and fixed within the conical member are a pair of photocells 86 and 87. Photocell 87 cannot be seen because it lies directly behind photocell 86. Suitable electrical connections are provided between the photocells and the lamp and the slip rings 76 to 80. Provision is made for moving the flat disc 83 transversely relative to cylinder 82 by means of an adjusting screw. A plurality of brushes such as 89 and 90 are mounted on an insulating structure 91 which in turn is mounted above the upper plate 27. These brushes engage the slip rings 76 to 80. These brushes and their mounting are shown in FIGURE 2 even though they are above the section line of the rest of the figure.

Mechanical system

The shaft 26 is locked to the driveshaft which protrudes from the bottom of drive mechanism 11 and which rotates at a speed determined by the setting of control 19. The rotation of the shaft drives the pinions 30, 31, the shafts of which are locked to the upper frame 27 and therefore cause rotation of the ring gear 33 which in turn drives the disc 34 causing shaft 35 to rotate. Rotation of shaft 35 drives the bevel gear 39 which engages bevel gear 40 driving shaft 41 causing the wheel 47 to rotate. The rotation of this friction drive wheel causes the carriage to progress across the table. The direction of drive of the carriage, however, is determined by the position of sleeve 43 and this in turn is determined as follows:

Rotation of steereing motor 59 causes rotation of its shaft and therefore rotation of wheel 63 which engages disc 53 by means of tire 64, therefore rotation of the drive motor 59 causes rotation of sleeve 43. The upper disc 42 serves to distribute the forces on the lower disc 53 evenly by virtue of the inclusion of further wheels 65. Since the wheels are evenly spaced around the two discs and remain so, the separating forces between discs 42 and 53 are balanced so that the wheels are all continuously in contact with both discs. Rotation of sleeve 43 causes rotation of the toothed wheel 54 which in turn drives belt 55 and this in turn drives toothed wheel 69. Rotation of the toothed wheel 69 causes rotation of the tube 70 which in turn causes rotation of sleeve 75, thus causing the photo transistors 86 and 87 to rotate about the axis of the optical follower portion of the apparatus.

A clearer understanding of this particular portion of the apparatus may be had from a consideration of application Ser. No. 497,993, filed Oct. 19, 1965, in the names of Ronald J. Luker, Robert G. Simpson and George S. Jewell, which relates to the operation of the optical and electrical portion. It will be noted, however, that the photo transistors 86 and 87 are mounted side by side in advance of the axis of rotation of the optical sensing head and these two photo transistors may be moved transversely by rotation about this axis so that the angle of view of one or the other of the two photo transistors is caused to move towards the centre of the line.

Electrical circuit

The control of the steering motor by the optical sensing head is accomplished by means of the electrical circuit illustrated in FIGURE 3.

The complete description of this portion of the system is provided in the co-pending application referred to previously. It will be understood, however, that the mechanical steering mechanism described may be combined with any pattern detecting device which will produce a signal to energize motor 59 and which may be co-ordinated with the steering of the friction drivewheel by means of a drive belt or its equivalent.

Operations

Let us assume that a suitable supply is provided through conductor 21 to the drive mechanism 11, which in turn supplies suitable power to terminals 90 of the electrical circuit.

The operator, by manipulating lever 22 raises the mechanism from the table and removes cover 24 and thus closing switch 152 and putting the milliammeter 156 in circuit in place of the motor 59. He now adjusts the slider of potentiometer 114 until the meter reads zero. He then lowers the mechanism by means of lever 22 and adjusts potentiometer 111 until the meter reads zero when the optical tracing head is over a blank white sheet of paper. He repeats this several times because of the inter-relation of these two adjustments and then replaces the cover 24. The apparatus is then ready for operation. He moves it over the pattern, aligns it with the pattern, and lowers it into position, after setting control 19 for a certain speed of tracing.

While the mechanism is raised from the table, tube 43 drops downwards sliding in the sliding fit of bearing 50, thus disengaging disc 53 from engagement with wheel 63. Tube 43 may therefore be turned without turning wheel 63 or the shaft of motor 59. When the mechanism is lowered the pressure on wheel 46 is transmitted to tube 43 and forces it upward causing disc 53 to firmly engage wheel 63. The optical tracing head being substantially over the pattern produces an output depending upon its relationship to the pattern and causes motor 59 to rotate. Rotation of motor 59 causes rotation of wheel 64 which in turn rotates disc 53 turning sleeve 43 and steering the drivewheel 46. The drivewheel is driven by shaft 35 and causes the apparatus to proceed over the paper. It now proceeds in a direction determined by the position of sleeve 43 and with proper correlation between the pattern follower and the steering motor the pattern follower traces the pattern. In this way torch 15 is carried over the surface of the material to be cut, in a pattern substantially identical to the pattern 8. If now the torch 15 is suitably supplied with gas it may operate as a cutting torch and cut a sheet of material into a form substantially the same as pattern 8.

It will be appreciated that while the apparatus has been shown in association with a gas cutting torch, it may be used for other purposes where it is desired to reproduce a pattern. The pattern described is a line since the operation of the apparatus shown requires that the illumination on both photo transistors be substantially equal when the optical following head is correctly positioned over the pattern. It will be apparent that with an optical pattern detector intended to operate with a silhouette the apparatus would operate in a similar manner.

As is seen in FIGURE 2B, wheel 46 is offset from the axis of sleeve 43. The purpose of this offset is to correct for changes in velocity which would otherwise be caused by steering. The proper amount of offset is a function of the mechanical drive gear ratios and wheel diameter and is more fully explained in U.S. Patent 2,461,585 referred to previously.

The embodiments of the invention in which an exclusive property or privilege is claimed is defined as follows:

1. A steerable friction wheel drive mechanism for a pattern tracing machine including, a friction drive wheel engageable with a surface and steerable relative to said surface said drive wheel being mounted for driving rotation on shaft mounted at one end of a steerable tube, a disc mounted at the opposite end of said tube, a steering wheel rotatable in accordance with a steering signal mounted with its axis substantially radial to said disc and frictionally engaging said disc with a force proportional to the force of engagement of said friction wheel with said surface, a drive shaft co-axial with said tube and mechanically coupled to said drive wheel whereby rotation of said drive shaft causes driving rotation of said drive wheel and an input shaft arranged to be rotatably driven by a source of rotational power and mechanically coupled to said drive shaft.

2. A steerable friction wheel drive mechanism as claimed in claim 1 wherein said steerable tube is free to move axially over a limited distance causing said disc to move into and out of engagement with said steering wheel depending upon the axial position of said tube.

3. A steerable friction wheel drive mechanism as claimed in claim 2 wherein said steering wheel engages a further disc coaxial with said disc and a further pair of wheels equal in diameter to said steering wheel are spaced equi-angularly around the axis and between said discs whereby the forces of engagement of said disc and said driving wheel are essentially balanced by forces on said further pair of wheels to eliminate couples tending to produce angular displacement of the axis of said disc.

4. A steerable friction wheel drive mechanism as claimed in claim 2 wherein the drive shaft is coupled to said drive wheel through a right angle gear coupling.

5. A steerable friction wheel drive mechanism as claimed in claim 1, wherein said input shaft is coupled to said drive shaft through reduction gearing.

6. A steerable friction wheel drive mechanism as claimed in claim 1, wherein said disc has coaxially mounted thereon a toothed wheel engageable with a toothed belt for correlating the steering motion of an associated steerable optical pattern tracer.

7. A pattern following mechanism including a steerable friction drive wheel engageable with a surface and steerable relative to said surface said wheel being mounted for driving rotation on a shaft at one end of a tube and mechanically coupled to a drive shaft coaxial with said tube, a disc mounted at the other end of said tube said tube being mounted for steering rotation and limited axial motion in a base plate, a steering motor, a steering wheel driven by said steering motor mounted on said baseplate with its axis substantially radial to said disc and frictionally engaging said disc to thereby rotate said disc and steer said tube and said drive wheel, a toothed wheel mounted coaxially on said disc, a toothed belt engaging said toothed wheel, steerable optical pattern sensing device mounted on said base plate, a further toothed wheel mounted coaxially on said pattern sensing device and also engaging said toothed belt and means to derive steering signals from said pattern sensing device and apply said signals to said steering motor to cause said drive wheel to drive said mechanism in a course determined by a pattern viewed by said pattern sensing device.

References Cited

UNITED STATES PATENTS

| | | | |
|---|---|---|---|
| Re. 25,581 | 5/1964 | Cheverton et al. | 250—202 |
| 2,468,802 | 5/1949 | Begerow | 250—202 |
| 3,135,904 | 6/1964 | Purkhiser | 250—202 X |
| 3,268,731 | 8/1966 | Brouwer et al. | 250—202 |

JAMES W. LAWRENCE, *Primary Examiner.*

C. R. CAMPBELL, *Assistant Examiner.*

U.S. Cl. X.R.

250—203; 317—31